(12) United States Patent
Dorojevets et al.

(10) Patent No.: US 7,196,708 B2
(45) Date of Patent: Mar. 27, 2007

(54) PARALLEL VECTOR PROCESSING (75) Inventors: Mikhail Dorojevets, Port Jefferson, NY (US); Eiji Ogura, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 350 days.

(21) Appl. No.: 10/815,329

(22) Filed: Mar. 31, 2004

(65) Prior Publication Data

US 2005/0219422 A1 Oct. 6, 2005

(51) Int. Cl.
*G06F 15/16* (2006.01)
*G09G 5/36* (2006.01)
*H04N 9/64* (2006.01)
*G06T 1/20* (2006.01)
*G06F 15/80* (2006.01)

(52) U.S. Cl. ............... 345/502; 345/505; 345/506; 345/547; 345/559; 348/719; 348/721

(58) Field of Classification Search ........ 345/502–506, 345/547, 559, 561, 643; 348/719, 721, 492
See application file for complete search history.

(56) References Cited

U.S. PATENT DOCUMENTS 4,128,880 A    12/1978  Cray, Jr. ............... 364/200
4,725,973 A *  2/1988   Matsuura et al. ......... 708/520
5,226,171 A *  7/1993   Hall et al. ................. 712/9
6,847,365 B1 * 1/2005   Miller et al. ............ 345/502

OTHER PUBLICATIONS

A bit-serial VLSI array processing chip for image processing☐☐Heaton, R.; Blevins, D.; Davis, E.;☐☐Solid-State Circuits, IEEE Journal of ☐☐vol. 25, Issue 2, Apr. 1990 pp. 364-368 ☐☐Digital Object Identifier 10.1109/4.52157 ☐☐.*

* cited by examiner

*Primary Examiner*—Wesner Sajous
(74) *Attorney, Agent, or Firm*—Haverstock & Owens LLP (57) ABSTRACT

A video platform architecture provides video processing using parallel vector processing. The video platform architecture includes a plurality of video processing modules, each module including a plurality of processing elements (PEs). Each PE provides parallel vector processing. Specifically, means are provided to read all elements of one or two source vector registers in each PE simultaneously, process the read elements by a set of arithmetic-logical units (ALUs), and write back all results to one of the vector registers, all of which occurs in one PE cycle. To provide such parallel vector processing capabilities, the datapath of each PE is built as a set of identical PE processing slices, each of which includes an integer arithmetic-logical unit (ALU), a vector register bank, and a block register bank. A block/vector register bank holds all I elements of row J in a two-dimensional I×J data blocks for all block/vector registers provided by the architecture.

31 Claims, 6 Drawing Sheets

PARALLEL VECTOR PROCESSING

FIELD OF THE INVENTION

The present invention relates to the field of video processing. More particularly, the present invention relates to the field of video processing using parallel vector processing.

BACKGROUND OF THE INVENTION

Previous and current video processing techniques have only been partially successful when applied to current video processing algorithms because of significant control and addressing overhead, and high clock rate and power consumption requirements. These limitations resulted because the architectures used were designed to operate on data objects different from those that are typical in current video processing algorithms. Examples of such video processing architectures include pure vector, array, VLIW (Very Long Instruction Word), DSP (Digital Signal Processing), and general purpose processors with micro-SIMD (single-instruction multiple-data) extensions.

A parallel single-instruction multiple-data (SIMD) array architecture, having a two-dimensional rectangular array of processing elements (PEs) operating on its own set of data, is an architecture used for high-performance video processing applications. Programmable array architectures, using processing elements with varied complexity, are often referred to as being memory-oriented. The processing elements in such memory-oriented architectures operate on video streams from memory, or adjacent processing elements, and the results are written back to memory. While peak processing capabilities of such programmable array architectures can be quite high, their poor reuse of data leads to intensive memory traffic. As a result, performance suffers due to limited memory bandwidth available in such systems. This significantly limits the video standard complexity, frame rate, and size achievable with such programmable array architectures.

For extremely high-performance mobile applications requiring relatively low clock rate and power consumption compared to general purpose processors with micro-SIMD extensions, hard-wired array implementations of video algorithms are found to be efficient. Such application specific integrated circuits (ASICs) can reach high performance and low power consumption by providing a set of specialized units and interconnect structure tuned for video algorithm and data characteristics. ASICs efficiently reuse data fetched from memory into PEs, data created by PEs via the use of delay/buffer registers holding intermediate results, or data already fetched from memory, thus significantly decreasing the memory traffic. Unfortunately, ASICs have very limited to no programmability, and high development and verification costs. With costs of such ASICs currently reaching 60% or more of the cost of consumer video products, it is desirable to develop a solution that combines advantages of programmable SIMD array architectures with the efficiency and performance of video ASICs.

SUMMARY OF THE INVENTION

A video platform architecture provides video processing using parallel vector processing. The video platform architecture includes a plurality of video processing modules, each module including a plurality of processing elements (PEs). Each PE provides parallel vector processing. Specifically, means are provided to read all elements of one or two source vector registers in each PE simultaneously, process the read elements by a set of arithmetic-logical units (ALUs), and write back all results to one of the vector registers, all of which occurs in one PE cycle. To provide such parallel vector processing capabilities, the datapath of each PE is built as a set of identical PE processing slices, each of which includes an integer arithmetic-logical unit (ALU), a vector register bank, and a block register bank. A block/vector register bank holds all I elements of row J in a two-dimensional I×J data blocks for all block/vector registers provided by the architecture.

In one aspect, a method of processing video includes configuring a plurality of processing elements into a two-dimensional array of processing elements such that each processing element includes a plurality of vector registers, a plurality of block registers, a plurality of scalar registers, and a plurality of arithmetic logic units, wherein a data path of each processing element includes a set of processing element slices each coupled to one arithmetic logic unit such that each arithmetic logic unit receives a specified portion of each vector register as input, configuring a video stream into data blocks, loading the data blocks into the plurality of vector registers within each processing element, reading the specified portions of each vector register by each of the corresponding arithmetic logic units within all processing elements simultaneously, and processing the read portions by the arithmetic logic units such that the data blocks from the plurality of vector registers are processed in parallel. Loading the data blocks into the plurality of vector registers, reading the specified portions of each vector register, processing the read portions, and writing the results of the processing is performed within one processing element clock cycle. Each arithmetic logic unit is further configured to receive the contents of one of the scalar registers as input. When the contents of one of the scalar registers is used as input, a scalar register value is broadcast from the one scalar register to all arithmetic logic units within a given processing element. The plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice. The method further comprises accumulating the results of each slice accumulator into a global accumulator register. The method further comprises loading the data block into the plurality of block registers prior to loading the data blocks into the plurality of vector registers, such that the data blocks are loaded into the plurality of vector registers from the plurality of block registers. The method further comprises writing the results of the processing performed by the arithmetic logic units to the plurality of vector registers.

In another aspect, an apparatus to process video includes a main memory, and a two-dimensional array of processing elements, wherein each processing element includes a plurality of vector registers, a plurality of block registers, a plurality of scalar registers, and a plurality of arithmetic logic units, further wherein a data path of each processing element includes a set of processing element slices each coupled to one arithmetic logic unit such that each arithmetic logic unit receives a specified portion of each vector register as input, wherein video data is received by the main memory and configured as data blocks, the data blocks are loaded into the plurality of vector registers within each processing element, specified portions of each vector register are read by each of the corresponding arithmetic logic units simultaneously within all processing elements, the read portions are processed by the arithmetic logic units such that the data blocks from the plurality of vector registers are processed in parallel, and the results of the processing performed by the arithmetic logic units are written to the plurality of vector registers. Each arithmetic logic unit is further configured to receive the contents of one of the scalar registers as input. When the contents of one of the scalar registers is used as input, a scalar register value is broadcast from the one scalar register to all arithmetic logic units within a given processing element. The plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice. The apparatus further comprises a global accumulator unit to accumulate the results of each slice accumulator into a global accumulation register. The plurality of block registers receives the data blocks from the main memory and the plurality of vector registers receives the data blocks from the plurality of block registers. Each processing element further comprises a mask register to exclude processing of the processing element.

In yet another aspect, an apparatus to process video includes a two-dimensional array of processing elements, wherein each processing element includes a plurality of vector registers, a plurality of block registers, a plurality of scalar registers, and a plurality of arithmetic logic units, further wherein a data path of each processing element includes a set of processing element slices each coupled to one arithmetic logic unit such that each arithmetic logic unit receives a specified portion of each vector register as input. The apparatus further comprises a main memory coupled to the two-dimensional array of processing elements, wherein video data is received by the main memory and configured as data blocks, the data blocks are loaded into the plurality of vector registers within each processing element, specified portions of each vector register are read by each of the corresponding arithmetic logic units simultaneously within all processing elements, the read portions are processed by the arithmetic logic units such that the data blocks from the plurality of vector registers are processed in parallel, and the results of the processing performed by the arithmetic logic units are written to the plurality of vector registers. Each arithmetic logic unit is further configured to receive the contents of one of the scalar registers as input. When the contents of one of the scalar registers is used as input, a scalar register value is broadcast from the one scalar register to all arithmetic logic units within a given processing element. The plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice. The apparatus further comprises a global accumulator unit to accumulate the results of each slice accumulator into a global accumulation register. The plurality of block registers receives the data blocks from the main memory and the plurality of vector registers receives the data blocks from the plurality of block registers. Each processing element further comprises a mask register to exclude processing of the processing element.

DETAILED DESCRIPTION OF THE PREFERRED EMBODIMENT

A video platform architecture for video processing includes complex video compression/decompression algorithms in a computer with a two-dimensional Single-Instruction Multiple-Data (SIMD) array architecture. The video platform architecture includes one or more video processing modules, on-chip shared memory, and a general-purpose RISC central processing unit CPU used as a system controller. Each video processing module, or video module, includes a rectangular array of processing elements (PEs), a block load/store unit, and a global-accumulation unit.

Video to be processed is configured into blocks of data. A plurality of registers are provided in the processing elements and the block load/store unit to support two-dimensional processing of the data blocks. Types of registers used include block registers, vector registers, scalar registers, and exchange registers. Each of these registers is designed to hold a short ordered one- or two-dimensional set of video data (data blocks). These registers are arranged in a hierarchical configuration along the data flow path between the on-chip memory and processing units within the PE array.

Each vector or block register is capable of holding a small I×J (e.g., 2×4 8-bit or 1×4 16-bit) data block. In a first embodiment, each PE includes 16 vector registers, 16 block registers, and 4 scalar data registers, and the block load/store unit includes 2 exchange registers. Each of the 2 exchange registers includes M banks and is capable of holding M*I× N*J 2D data blocks, where M is the number of columns of the PE array, and N is some positive integer value. In the first embodiment of the video platform architecture, I=1 or 2 (depending on the data type), J=4, M=4, and N=8, where M is chosen to match the number of columns in the PE array. Thus, the maximum size of two-dimensional data blocks that each of the 2 four-bank exchange registers are configured to hold is either 8×32 bytes (pixels) or 4×32 16-bit half words.

Means are provided to implement a data flow path via distinct transfer and data alignment steps. One such step includes transferring data between the on-chip memory and the two-dimensional exchange registers in the block load/ store unit when performing one- and two-dimensional block load/store instructions. In the first embodiment, the on-chip memory holds the video data arranged sequentially in either a row- or column-major manner. Other steps include moving data between the exchange registers in the block load/store unit and the block registers within the PE array, moving data between the block registers and the vector registers within PEs of the PE array, processing data blocks in each PE using data either from a pair of any of the PE's vector and scalar registers or from the PE's local accumulator as input operands to functional units within the PE, the results are placed into one of any of the PE's vector and scalar registers or the local accumulator, moving data between any of the block registers of adjacent PEs within the PE array, and moving data from any of the block registers to one of the exchange registers (XR1), while simultaneously performing a specified horizontal shift (data alignment) of their elements and further loading the aligned data blocks into any of the block registers of non-adjacent PEs or storing them in memory.

Arranging the registers in a hierarchical configuration allows data alignment, transform, and processing operations to be performed on one- and two-dimensional data in registers rather than on-chip memory, as is done in many conventional image/video processing techniques. Performing such operations using registers instead of on-chip memory provides significant performance benefits.

Figure 2:
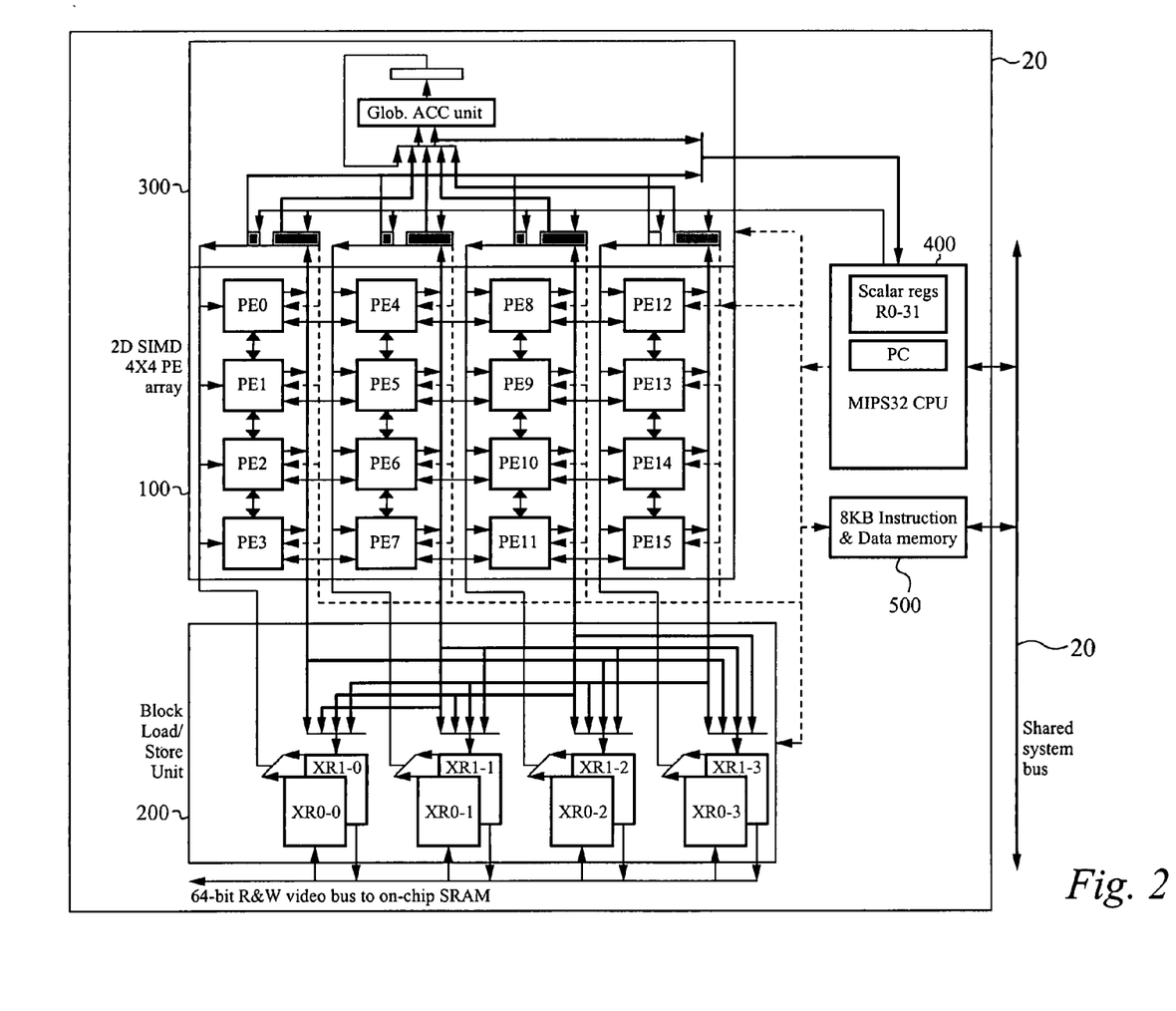
FIG. 2 illustrates a block diagram of a video module illustrated in FIG. 1.

The distributed organization of block and vector registers across a rectangular PE array provides a good match for the data organization in video applications where processing is done on rectangular data blocks of a relatively small size, from 2×2 to 16×16 bytes. Such a distributed organization provides programmable register storage with high-speed and high-bandwidth access to video data loaded into the registers. Also, high-bandwidth register transfer between block registers of neighboring PEs enables high communication efficiency via transfer of the data once loaded/calculated in one PE to another PE without the necessity of loading the data from memory. Non-local data transfer between block registers of non-adjacent PEs in the PE-array is performed using two steps. During the first step, data from any of the block register(s) selected as a source are loaded into the XR1 exchange register (FIG. 2). The 4 register banks available in the XR1 exchange register are connected to the 4 columns of the PE array through a 4×4 crossbar data switch allowing data from any column to be loaded into any bank of the exchange register XR1. Such configuration of the exchange registers gives two opportunities for fast and flexible data transfer, namely parallel data transfer data from all 4 "source" PEs belonging to one selected row of the PE array, and data alignment performed during the transfer when the destination register bank for a data block from each of the source PEs is calculated by the modulo 4 addition of the source PE column and the horizontal (bank) offset specified in the instruction moving data from a selected block register in the source PEs to the XR1 exchange register. Similar data alignment can be performed when loading data blocks from memory into the exchange register (FIG. 2). During the second step, the aligned data from the XR1 exchange register are loaded into the specified destination block register of the target PEs belonging to one selected row of the PE array.

Processing operations in each PE are performed on data in vector and scalar registers. In conventional vector processing architectures, the elements of one or more vector registers are successively transmitted to the input of a functional unit, and the results from the output of the functional unit are successively written as the elements of one of the vector registers. In these architectures, the length of vectors to be processed is determined by the value in a vector length register.

Compared to such conventional vector architectures, the video platform architecture provides parallel vector processing in each PE. Specifically, means are provided to read all elements of one or two source vector registers in each PE simultaneously, process the read elements by a set of identical arithmetic-logical units (ALUs), and write back all results to one of the vector registers, all of which occurs in one PE cycle. No vector length register is involved. When necessary, the value of a condition mask register is calculated as a result, and later used in conditional merge operations to specify which elements of the destination vector register are to be changed as a result of such conditional operations. In the first embodiment, the condition mask register is a bit vector with one bit per each data element in a vector register.

To provide such parallel vector processing capabilities, the datapath of each PE is built as a set of identical PE processing slices, each of which includes an integer arithmetic-logical unit (ALU), a vector register bank, and a block register bank. The number of processing slices corresponds to the vertical size (length) of block and vector registers, or in other words, the maximum number of rows (J) of I×J data blocks that are capable of being held in these registers. Each block or vector register bank J holds I elements of row J of all block or vector registers available in a processing element. In the first embodiment of the architecture, each block and vector register holds 4 rows of data elements (e.g., J=4), with either 2 8-bit data elements (pixels) or 1 16-bit half word element per row.

In the first embodiment, each block register bank has one read port compared to two read ports in each vector register bank. Each of the PE processing slices within a given PE share a local accumulation unit, four scalar registers each capable of holding I row elements, a status and control register, and vector and block base registers. The vector and block base registers provide a relative register addressing mode in addition to a traditional absolute register addressing mode for vector and block base registers supported by the architecture. In a relative addressing mode, the physical block/vector register number is calculated by a modulo N addition of the register offset value from an instruction and the current value of the block/vector base register, where N is the number of block/vector registers available in a processing element. In a traditional absolute register addressing mode, a physical register number is specified directly by the value of the corresponding instruction field. Such segmentation of each PE's datapath into identical slices provides the scalable PE design that can be tuned for applications with different performance and power requirements.

As discussed above, the first embodiment of the processing element has 16 vector registers and 16 block registers, each capable of holding 2×4 8-bit, e.g., I=2 and J=4, or 1×4 16-bit data blocks, e.g., I=1 and J=4. Thus, each PE in the first embodiment has four processing slices, while each vector and block register bank J holds two 8-bit elements or one 16-bit element belonging to row J of I×J data blocks in each of the 16 vector and block registers.

Each vector register bank has two read and one write ports, each of width I. The instruction set of processing elements allows PE operations to specify any of the vector register as one/two data sources and any of the vector registers as a destination for the operations. When performing operations on vector registers, two input data values of width I are read from each vector register bank and one result of width I is written into each vector register bank in each of the J processing slices within each PE. The ALU available in each processing slice processes all I elements of two sources, and then writes back I results to its vector register bank simultaneously. One of the input values of width I can be read from a scalar register selected from any of PE's scalar registers and then broadcasted to all processing slices as input. A result of an ALU operation can be written into one of any of PE's scalar registers, and some operations write their results into the condition register or the local accumulator.

In the first embodiment of the architecture, each ALU within each processing slice calculates and writes back either two 8-bit results (I=2) or one 16-bit result (I=1) each cycle. Thus, in each PE cycle, all data elements of two input 2×4 or 1×4 blocks are processed using the 4 PE processing slices. Some operations, e.g., multiply and accumulate, take more than one cycle.

Each block register bank in each of the J processing slices available in each PE has one read and one write port of width I, so one value of width I is read and one value of width I is written each cycle. When moving data between vector and block registers, all data elements of a I×J data block that is held in any of vector/block registers are transferred in one cycle. In the first embodiment the value of I is either 2 (for 8-bit data types (used typically for 8-bit pixels) or 1 (for 16-bit half word values), and J=4, one dimensional I×J data block has 8 elements. Thus, either eight 8-bit pixels or four 16-bit half word values can be transferred between any vector and any block register in each PE each cycle.

Figure 1:
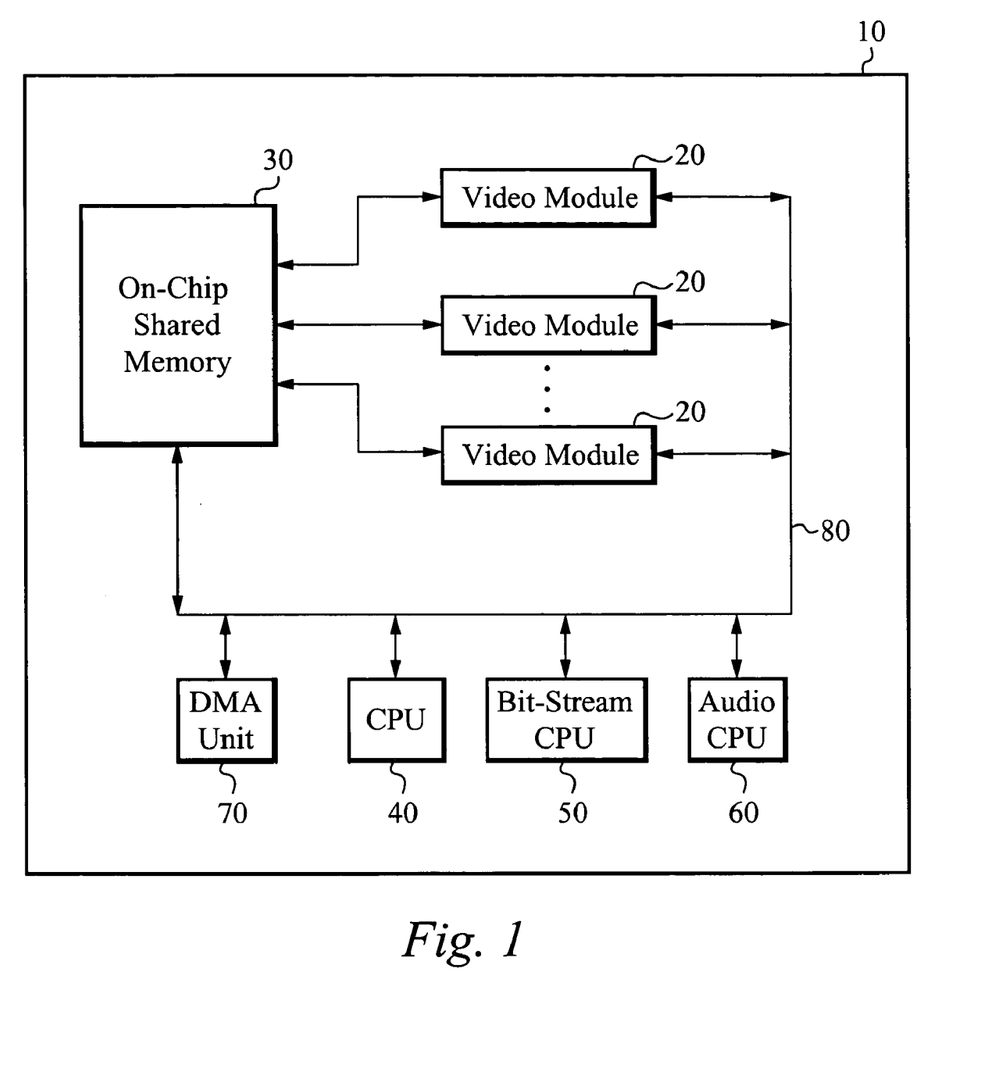
FIG. 1 illustrates a video platform architecture including multiple video modules.

FIG. 1 illustrates a first embodiment of a video platform architecture 10 including multiple video modules 20. The video platform architecture 10 also includes an on-chip shared memory 30, a system central processing unit (CPU) 40, a bit stream CPU 50, an audio CPU 60, and a direct memory access (DMA) unit 70, all coupled together by a system bus 80. In the first embodiment, the CPU 40 is a 32 bit RISC CPU and the audio CPU 60 is a 32-bit audio CPU preferably extended with floating-point processing capabilities. Alternatively, the audio CPU 60 is a 32-bit audio CPU not extended with floating point processing capabilities. In the first embodiment, the on-chip shared memory 30 includes a 128KB SRAM and a plurality of read/write buffers. Also in the first embodiment, the video platform architecture 10 is coupled to an off-chip DDRAM (not shown). In an alternative embodiment, the video platform architecture includes a single video module 20. In this alternative embodiment, the use of a dedicated audio CPU, such as the audio CPU 60, is avoided by implementing audio processing in a local CPU included within the single video module 20, where the local CPU is extended with floating-point capabilities, if necessary.

FIG. 2 illustrates a block diagram of the video module 20 illustrated in FIG. 1. The video module 20 includes a processing element (PE) array 100, a block load/store unit 200, a global accumulation unit 300, a local CPU 400 and an instruction and data memory 500. In the first embodiment the local general-purpose CPU 400 is a 32-bit MIPS CPU and includes 32 scalar registers, and the instruction and data memory 500 is an 8 KB memory. All other units of the video module 20, such as the PE array 400, the block load/store unit 200, and the global accumulation unit 300, are implemented as a video co-processor to the local 32-bit MIPS CPU and connected to the latter through the standard MIPS co-processor interface. The block load/store unit 200 of each video module 20 is connected to the on-chip shared memory 30 (FIG. 1) via a direct high-bandwidth data path. Alternatively, one high-bandwidth bus is shared by all video modules 20. In the first embodiment, the PE array 100 is a two-dimensional SIMD (single-instruction multiple-data) 4×4 PE array, including 16 video processing elements (PEs). Each processing element within the PE array 100 is described in detail below in reference to FIG. 3. The block store/load unit 200 is described in detail below in reference to FIG. 4. The global accumulation unit 300 is described in detail below in reference to FIG. 5. Each video module 20 has a parallel heterogenous architecture extending a conventional RISC (reduced instruction set computer) architecture with support for video processing in the form of the two-dimensional SIMD 4×4 PE array 100, the block load/store unit 200, and the global accumulation unit 300. The 4×4 PE array 100 is configured according to 4 vertical slices, each vertical slice including 4 processing elements. As shown in FIG. 2, a first vertical slice includes PEs 0–3, a second vertical slice includes PEs 4–7, a third vertical slice includes PEs 8–11, and a fourth vertical slice includes PEs 12–15. All PEs in each slice share their own set of buses, such as a 32-bit instruction bus, a 16-bit data read bus, a 16-bit data write bus, a 1-bit PE mask read bus, and a 1-bit PE mask write bus, with each of the buses having its own set of control signals.

Figure 3:
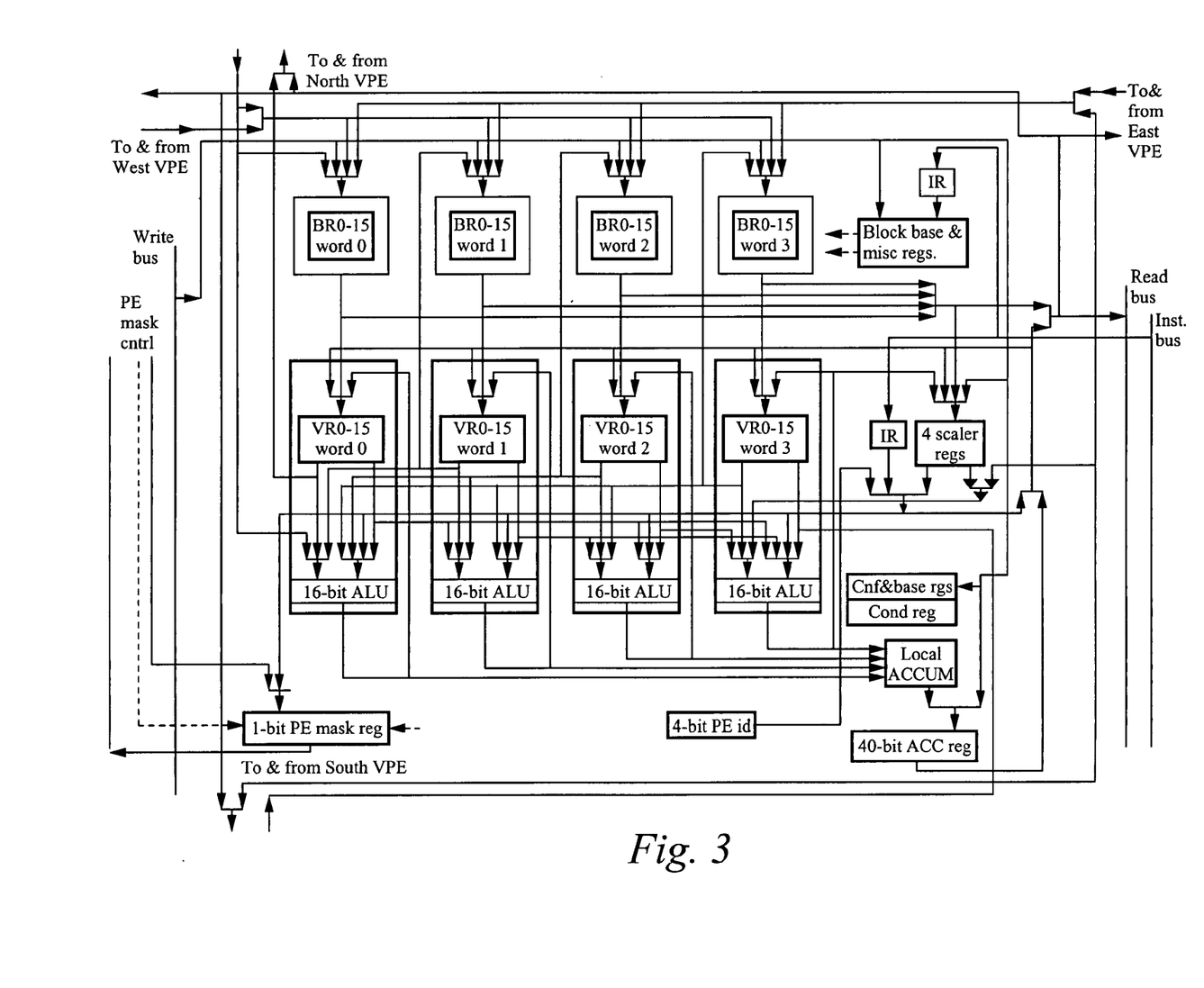
FIG. 3 illustrates a block diagram of a processing element illustrated in FIG. 2.

FIG. 3 illustrates a block diagram of a first embodiment of a video processing element (PE) included within the PE array 100 illustrated in FIG. 2. In the first embodiment, each PE includes 16 integer vector registers, 16 integer block registers, 4 scalar registers, 1 local accumulation register, 1 condition register, 1 PE mask register, 1 block base register, 1 vector base register, 1 PE status/control register, and a partitioned integer ALU (arithmetic logic unit). In the first embodiment, the partitioned integer ALU executes 8 8-bit or 4 16-bit operations per cycle, which results in 128 8-bit operations per cycle per video module.

ALU data processing operations are performed on vector registers and scalar registers only. Each vector register includes 4 16-bit half words. Each 16-bit value of each half word is considered either as 2 packed 8-bit values called bytes or one 16-bit value called a half word. Each 16-bit value is either signed or unsigned. Access to vector registers is done either in absolute or relative register modes. For the relative register mode, the PE's vector base register is used. In order for values in a vector register to be moved from the PE to the block load/store unit, the value in the vector register is moved to one of the PE's block registers. In the first embodiment, there are 16 vector registers per PE, 4 16-bit half words per vector register, and 2 pixels per half word.

Block registers serve as an intermediate register level allowing the exchange of data between the PE and the block load/store unit, or between two PEs, to proceed in parallel with operations on vector registers inside PEs. In the first embodiment, there are 16 block registers (BRs) per PE, each block register holding 4 16-bit data half words. The block registers are used for exchanging data between the PE and a neighboring PE, and between the PE and the block load/store unit. In order to be processed by ALUs, data in the PE's block register is moved to one of the PE's vector registers. All data exchange operations on block registers expect 16-bit operands in each half word of the data block. The number of half words to be moved is either implicitly known to be the full length of a block register, e.g. 4, or specified in block move instructions. In the first embodiment, there are 16 block registers per PE, 4 16-bit half words per block register, and 2 pixels per half word. In the absolute register addressing mode, only the first 4 of the 16 vector or 16 block registers in each PE are accessible by vector/block instructions. In the relative register addressing mode, any of the 16 vector or 16 block registers in each PE are accessible by vector/block instructions.

The block base register and the vector base register provide the capability of addressing block and vector registers indirectly using a base addressing mode. In the first embodiment, the block base register is a 4-bit register, and the vector base register is a 4-bit register. The physical vector/block register number of source/destination vector/block register is calculated as follows. For each of the vector/block register operands, an instruction provides a 5-bit register ID field, consisting of a one-bit mode field, and a 4-bit register offset field. The mode bit specifies which mode, absolute (when the value of the bit is 0) or relative (when the value of bit is 1), is to be used to calculate the physical register number of this operand. In the relative addressing mode, the physical block/vector register number is calculated by the modulo 16 addition of the value of a 4-bit register offset field and the current value of the 4-bit block/vector base register. When the mode bit indicates the absolute addressing mode, the physical register number is specified directly by the value of the 4-bit register offset field.

Scalar registers are used as the second source or destination register in ALU operations. When a scalar register is specified as the destination register for an ALU operation, the value written into this scalar register is the value otherwise written into the last half word of a vector register, if the latter was the destination for the result. When a scalar register is specified as a source register, its value is broadcast to all ALUs within the PE as an input vector, where the input vector value is the value from the scalar register. In the first embodiment, each PE includes 4 16-bit scalar registers and 4 16-bit ALUs.

The local accumulation register (LACC) is either one 40-bit field or 2 20-bit fields. The values of these fields is set as a result of multiply, add, subtract, and accumulate operations, and the operation of calculating the sum of absolute differences (SAD) of 8 pixels (bytes) in two source vector registers. Each PE's 40-bit LACC is read in steps, specifying which part of the LACC, low 16 bits, middle 16 bits, or high 8 bits, are to be placed on the 16-bit bus connecting each PE slice to the global accumulation unit and the block load/store unit.

The condition register, also referred to as the condition mask register, acts as an implicit source in conditional move operations on vector registers. In the first embodiment, the condition mask register has 8 bits. All bits are set as a result of byte compare operations on 8 bytes in vector source register(s). Only 4 (even) bits are set when compare instructions operate on 4 16-bit half words, and the remainder of the bits are set to zero.

The PE mask register is written either from outside the PE by the control MIPS CPU 400 (FIG. 2) via a global PE mask register, which is described in greater detail below, or by the PE itself as a result of internal move operations which sets the PE mask register. During computation, when necessary, the local CPU 400 (FIG. 2) excludes some PEs from processing by setting their masks to zero. Later, each of the "active" PEs, that is those PEs not excluded by the local CPU 400, is capable of excluding itself from the computation by calculating a required condition and loading it into its own PE mask register. When necessary, the local CPU 400 reactivates such "sleeping" PEs by loading their PE mask registers with non-zero values. With the condition mask register and the PE mask register, the video platform architecture is able to support parallel conditional operations within the two-dimensional PE array. The ability of each PE to exclude itself from computations within the two-dimensional PE array based on conditions calculated by ALUs inside the PE and written into PE masks, avoids the necessity of performing all control decisions for each individual PE by the video module's local CPU 400. The local CPU 400 typically performs global control decisions. As for local conditions dependent on data within block and vector registers, all PEs are capable of calculating these conditions in parallel. The calculated conditions are then used to either mask the PE in or out of computation by loading these conditions into the PE mask register, or used in conditional data move/merge operations controlled by contents of the condition masks to replace conditional branches.

A PE ID register is a read-only register that specifies the physical ID of the PE within the PE array. The PE ID register is used in shift operations to select bits related to each PE, when input half words are compressed bit vectors including information about all PEs in the PE array. In the first embodiment, the PE ID register is 4-bits.

When moving data between the block load/store unit (e.g., to/from exchange registers) and PEs in the PE array in parallel with current processing in the PE array, it is necessary to select which of the PE are to participate in such data move operations within a video module. Logically, instructions moving data blocks between exchange and block registers specify either a whole PE array or only PE(s) in one row of the PE array involved in the operations. Since the number of half words that are read from exchange register cannot exceed the number of columns of the PE array, the hardware in the block load/store unit implements the data move operation on a whole PE array with 4 data move operations, one per each row of the PE array. The selection of the source/destination PE row is done using a relative addressing mode with the PE row base register. The physical PE row address is calculated by unsigned modulo 4 addition of the contents of the PE row base register and PE row offset value from the corresponding data move instructions. In the first embodiment, the PE row register is 2-bits and the PE row offset value is 2-bits.

Figure 4:
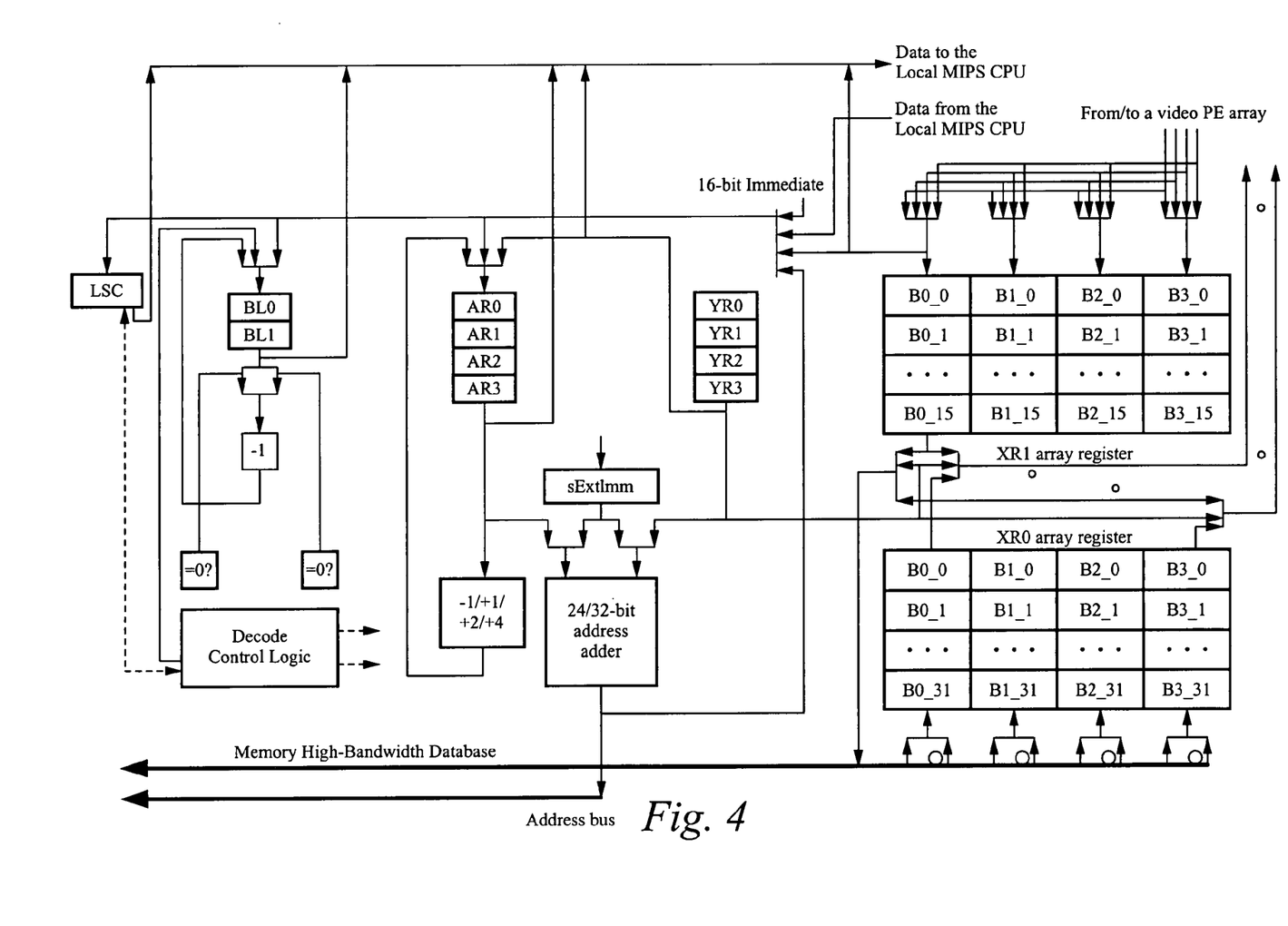
FIG. 4 illustrates a block diagram of the block load/store unit illustrated in FIG. 2.

FIG. 4 illustrates a block diagram of a first embodiment of the block load/store unit 200 illustrated in FIG. 2. In the first embodiment, the block load/store unit 200 includes 2 data exchange block buffers (XR0 and XR1 array registers), 4 address registers (AR0–AR3), 4 index registers (YR0–YR3), 2 block length registers (BL0 and BL1), and a block load/store status/control register (LSC). The block load/store unit 200 also includes an address adder and other adders used to calculate memory address and post-increment/decrement address and block length registers during block transfer operations.

The XR0 and XR1 array registers are global exchange array registers. In the first embodiment, both the XR0 and XR1 array registers are two-dimensional memory arrays including 4 columns, also referred to as banks, each one half-word wide and 32 half-words deep. Output of each bank is connected to the corresponding PE slice's write data bus. The high-bandwidth memory bus is connected to an input port of each bank of the XR0 array register via a 4-to-1 multiplexor, which allows data from on-chip memory 30 (FIG. 1) to be aligned before loading them into the XR0 array register. During operation, all banks of each XR0 and XR1 array register are capable of reading or writing data. Read/write operations on the XR0 and XR1 array registers use 4-bit vectors as masks specifying which of the banks participate in the operations. The XR0 array register is used as the implicit destination register when loading input data blocks from on-chip memory 30 (FIG. 1) into the block load/store unit 200 (FIG. 2). Then, these data are moved to selected block registers of PEs in the PE array 100 (FIG. 2). Before processing these data, each PE moves the data from the block register to any of the vector registers. In order to store PE results in memory, the results from the PE's vector register are first moved to any of the PE's block registers, then to the XR1 array register, from which they can be stored in memory by block store instructions. The XR1 array register is also used as an intermediate data aligning buffer in global data exchange operations between non-adjacent PEs in the PE array 100 (FIG. 2). In these operations, data from a block register of a selected set of PEs belonging to one row of the PE array 100 are moved into the XR1 array register by one data move instruction, if necessary being aligned before written into the XR1 array register's banks. Then, by executing another data move instruction, the XR1 array register data is moved into any of the block registers of any of the selected destination PEs belonging to one row of the PE array 100 (FIG. 2).

The exchange array registers, XR0 and XR1, serve as intermediate buffers in data transfer operations moving data between on-chip shared memory and block registers as well as between block registers of non-adjacent PEs. In the first embodiment, the size of each array register is 4×32 16-bit half words, the size allowing each array register to hold one full 16×16 byte block, e.g., a full 16×16 macroblock of pixels.

One- and two-dimensional half word/word blocks are loaded from on-chip shared memory into the array register XR0 and moved from the array register XR1 to on-chip shared memory. Because an identification of the array registers during load/store operations are always known, these identifications need not be specified in the corresponding load and store instructions operating with these array registers. Rather than specifying an identification specific to an array register, the load/store instructions specify the layout of data, e.g, how words/half-words are to be loaded into or fetched from four banks available in each of the two array registers XR0 and XR1. Each of these four banks represents one column of an exchange array register.

During load/store of a half word block or the global data exchange operations, four half words, each from a different bank, are written or read to/from an exchange array register simultaneously during one video module cycle. During the load/store word block operations, two half words are written or read to/from each exchange array register bank sequentially during two video module cycles. The speed of a video module memory bus is expected to be half of the video platform video module clock speed. The banks involved in these block transfer operations are specified by a 4-bit bank map field.

During data transfer, the bank from which the first word/half word is read from or written to is specified by the leading non-zero bit of the bank map field. Other non-zero bits, if any, show the banks from which other words/half words are to be read or written to, all with the same row address as the row address used for the first half word. After all words/half words specified by nonzero bits of the bank map field are read/written, the row address for the array register involved in the data transfer is incremented by the vertical (half word) stride before the next group of half words is read/written from/to the array register.

The vertical stride is either one, as in a load/store instruction, or is specified by the corresponding field in the block transfer instructions moving data between the array register XR1 and the PEs' block registers. The initial row address is specified by a vertical half word offset field in the block transfer instructions.

Address registers are used in all load/store instructions within the block load/store unit 200. When involved in one and two dimensional data transfer between on-chip shared memory 30 (FIG. 1) and a video processor module 20 (FIG. 1), the corresponding address registers are post-updated by a corresponding stride value (+1/−1) after initiating each load/store word/half-word operation. In the first embodiment, there are 4 24/32-bit address registers (AR0–AR3) in the block load/store unit 200.

Index registers and block length registers are involved in two-dimensional block transfer operations. In the first embodiment, the block load/store unit 200 includes 4 16-bit index registers (YR0–YR3) and 2 16-bit block length registers (BL0–BL1).

The structure of the block load/store status/control (LSC) register is established based on the communication protocol between the local 32-bit MIPS CPU 400 (FIG. 2) and the block load/store unit 200. A condition control field within the LSC register includes 8 condition bits that are checked by the 32-bit MIPS CPU 400. In the first embodiment, there is one LSC register in the block load/store unit 200.

Figure 5:
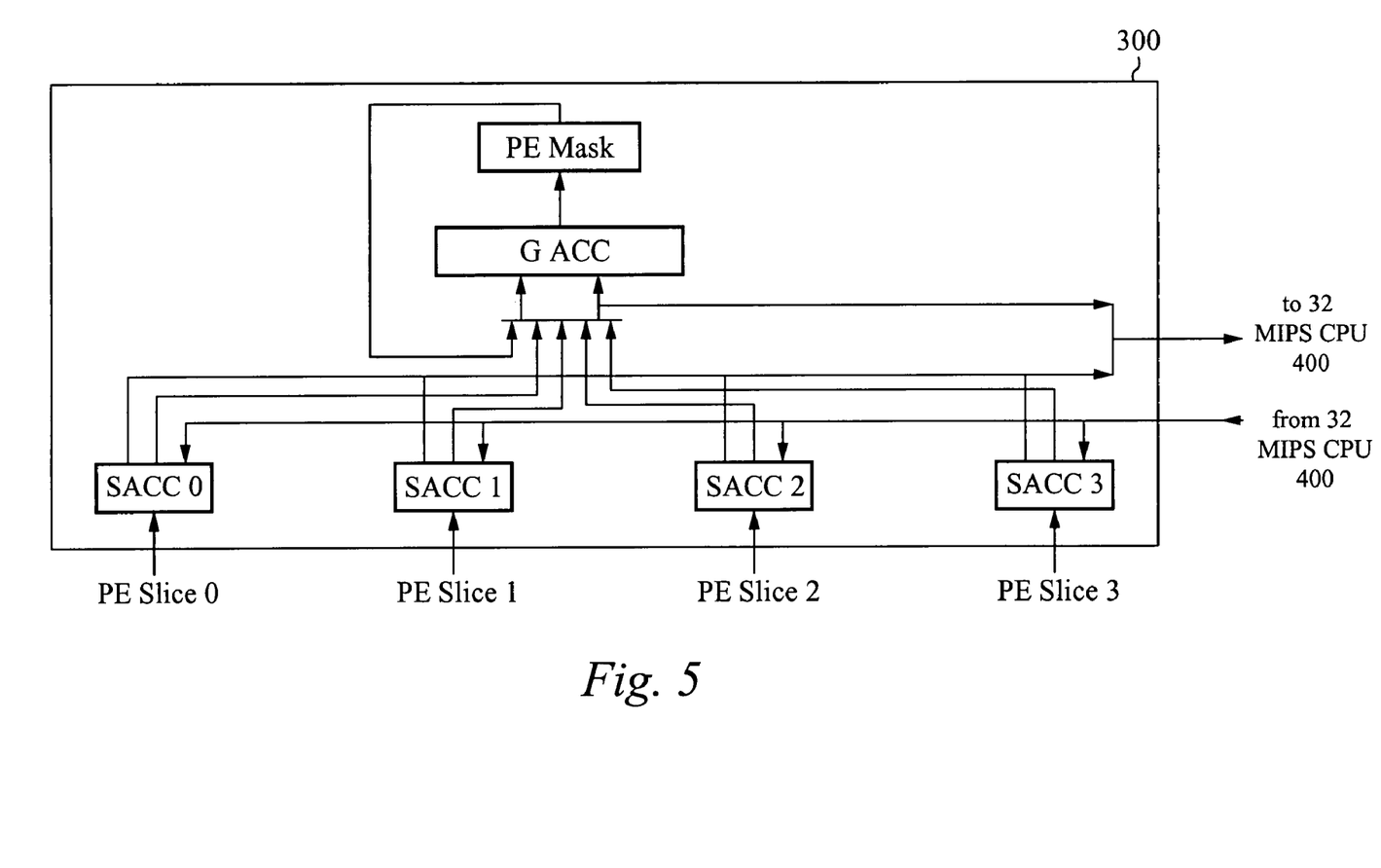
FIG. 5 illustrates a block diagram of the global accumulation unit illustrated in FIG. 2.

FIG. 5 illustrates a block diagram of a first embodiment of the global accumulation unit 300 illustrated in FIG. 2. In the first embodiment, the global accumulation unit 300 includes 4 slice accumulation (SACC) registers, 1 global PE mask control register, and 1 global accumulation (GACC) register.

There is one SACC register for each vertical PE slice of the PE array 100 (FIG. 2). The SACC registers are the intermediate registers in the operations moving data from the LACC register of each PE to the GACC register. In the first embodiment, there are 4 40-bit SACC registers in the global accumulation unit 300. Each of the SACC registers includes three individually written sections, namely low 16-bits, middle 16-bits, and high 8-bits. Each PE's 40-bit LACC is read in steps, specifying which part of the LACC, low 16-bits, middle 16-bits, or high 8-bits, is to be placed on the 16-bit bus to the global accumulation unit 300, and finally into corresponding section of the appropriate SACC register. During operation of the global accumulation unit 300, either the full 40-bit values or packed 20-bit values of the SACC register involved in the accumulation operations are added together by a global add instruction and a global add and accumulate instruction.

The GACC register is used to perform global accumulation of LACC values from multiple PEs loaded into the corresponding SACC registers. In the first embodiment, there is one 48-bit GACC register in the global accumulation unit 300.

The contents of the global PE mask control register represents the compressed vector of the local PE mask registers. In the first embodiment, there is one 16-bit global PE mask control register. When loading data into the global PE mask control register, all 16 local PE mask registers are set by the values of their representative bits in the global PE mask control register. When moving data from the local PE mask registers in the PE array 100 to the block load/store unit 200, all 16 1-bit values from the local PE mask registers are packed as 1 16-bit vector which is loaded into the global PE mask control register.

Figure 6:
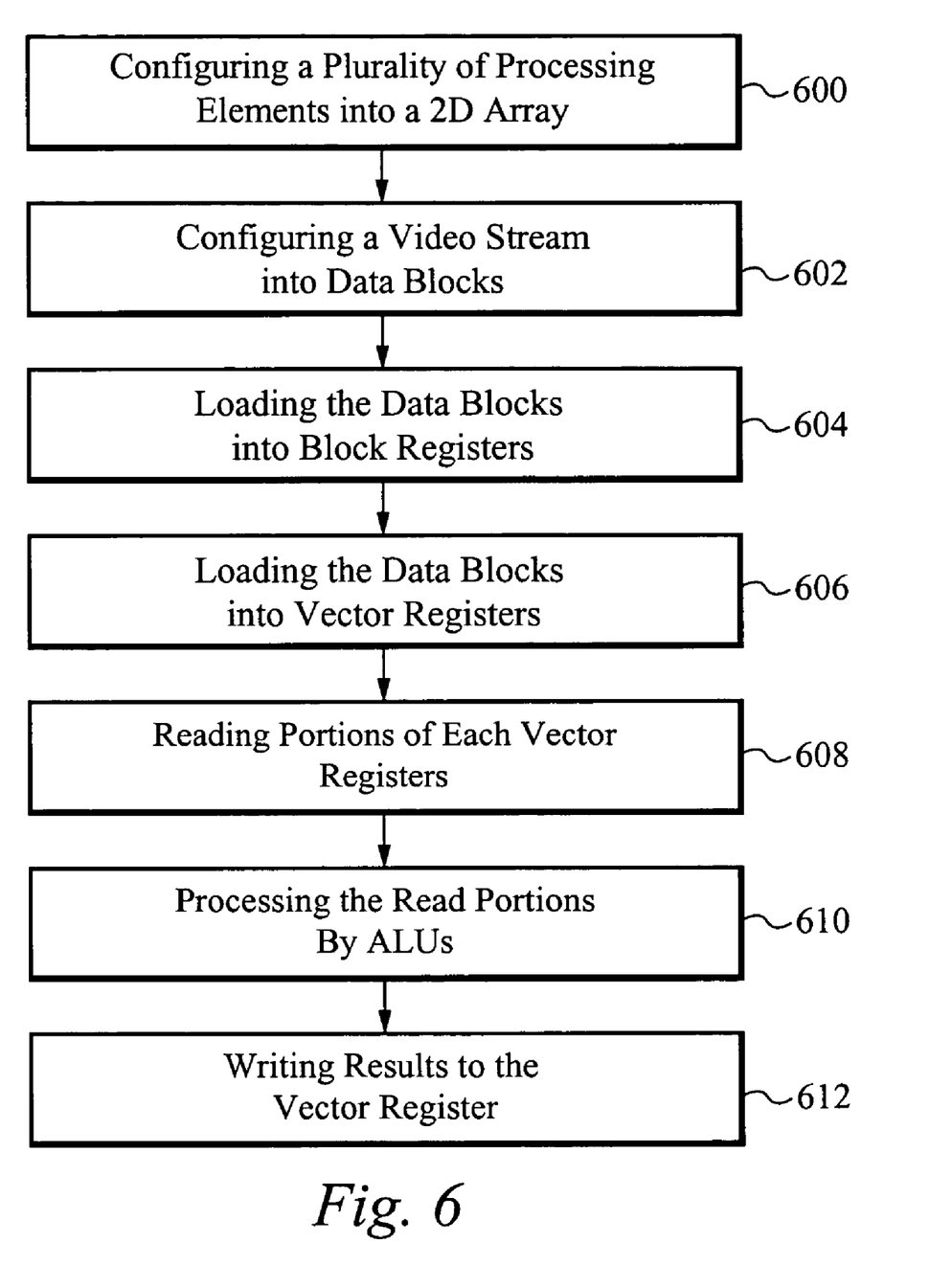
FIG. 6 illustrates a method of performing parallel vector processing.

FIG. 6 illustrates a method of performing parallel vector processing. In the step 600, a plurality of processing elements are configured into a two-dimensional array of processing elements. Each processing element includes a plurality of vector registers, a plurality of block registers, a plurality of scalar registers, and a plurality of arithmetic logic units. A data path of each processing element includes a set of processing element slices each coupled to one arithmetic logic unit such that each arithmetic logic unit receives a specified portion of each vector register as input. At the step 602, a video stream is configured into data blocks. At the step 604, the data blocks are loaded into the plurality of block registers within each processing element. At the step 606, the data blocks are loaded from the plurality of block registers to the plurality of vector registers. At the step 608, specified portions of each vector register are read by each of the corresponding arithmetic logic units. At the step 610, the read portions are processed by arithmetic logic units such that the data blocks from the plurality of vector registers are processed in parallel. That is, the step 608 and 610 are performed simultaneously by all arithmetic logic units in all processing elements. At the step 612, the results of the processing performed by the arithmetic logic units are written back to the plurality of vector registers.

In operation, a video stream is received by a video platform architecture which configures the video stream into data blocks and sends the data blocks to an array of processing elements. Each data block is configured according to I columns and J rows of data elements. The processing elements are configured into a two-dimensional array, each processing element including a plurality of vector registers, a plurality of block registers, a plurality of scalar registers, and a plurality of arithmetic logic units (ALUs). Each block register and each vector register are configured to hold one data block. Within each processing element, identical data paths are configured which essentially divide the processing element into processing slices. Each processing slice includes a vector register bank, a block register bank, and an arithmetic logic unit. Each block register bank holds all I elements of row J for each I×J data block for all block registers in the processing element. Data blocks are processed while in the vector registers. As such, to process the data blocks, the data blocks are loaded into the plurality of vector registers from the plurality of block registers. Similar to the block register bank, each vector register bank holds all I elements of row J for each I×J data block for all vector registers in the processing element. The ALU for each processing slice accepts as input the contents of one or two sources. One vector source is the vector register bank, and a second vector source is one of the scalar registers. When the contents of one of the scalar registers is used as input, a scalar register value is broadcast from the one scalar register to all ALUs within the given processing element. The ALU processes the input data from the vector sources. In other words, the ALU for each processing slice of the processing element processes all I elements within the processing slice, and then writes back I results to its vector register bank, simultaneously.

Results from each ALU are accumulated by a local accumulator register within each processing element. The results of each local accumulator register are accumulated by a global accumulation register.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:
1. A method of processing video comprising:
  a. configuring a plurality of processing elements into a two-dimensional array of processing elements such that each processing element includes a plurality of vector registers, a plurality of block registers, a plurality of scalar registers, and a plurality of arithmetic logic units, wherein a data path of each processing element includes a set of processing element slices each coupled to one arithmetic logic unit such that each arithmetic logic unit receives a specified portion of each vector register as input;
  b. configuring a video stream into data blocks;
  c. loading the data blocks into the plurality of vector registers within each processing element;
  d. reading the specified portions of each vector register by each of the corresponding arithmetic logic units within all processing elements simultaneously; and
  e. processing the read portions by the arithmetic logic units such that the data blocks from the plurality of vector registers are processed in parallel.

2. The method of claim 1 wherein loading the data blocks into the plurality of vector registers, reading the specified portions of each vector register, processing the read portions, and writing the results of the processing is performed within one processing element clock cycle.

3. The method of claim 1 wherein each arithmetic logic unit is further configured to receive the contents of one of the scalar registers as input.

4. The method of claim 3 wherein when the contents of one of the scalar registers is used as input, a scalar register value is broadcast from the one scalar register to all arithmetic logic units within a given processing element.

5. The method of claim 1 wherein the plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice.

6. The method of claim 5 further comprising accumulating the results of each slice accumulator into a global accumulator register.

7. The method of claim 1 further comprising loading the data block into the plurality of block registers prior to loading the data blocks into the plurality of vector registers, such that the data blocks are loaded into the plurality of vector registers from the plurality of block registers.

8. The method of claim 1 further comprising writing the results of the processing performed by the arithmetic logic units to the plurality of vector registers.

9. An apparatus to process video, the apparatus comprising:
  a. a main memory; and
  b. a two-dimensional array of processing elements, wherein each processing element includes a plurality of vector registers, a plurality of block registers, a plurality of scalar registers, and a plurality of arithmetic logic units, further wherein a data path of each processing element includes a set of processing element slices each coupled to one arithmetic logic unit such that each arithmetic logic unit receives a specified portion of each vector register as input;

wherein video data is received by the main memory and configured as data blocks, the data blocks are loaded into the plurality of vector registers within each processing element, specified portions of each vector register are read by each of the corresponding arithmetic logic units simultaneously within all processing elements, the read portions are processed by the arithmetic logic units such that the data blocks from the plurality of vector registers are processed in parallel, and the results of the processing performed by the arithmetic logic units are written to the plurality of vector registers.

10. The apparatus of claim 9 wherein each arithmetic logic unit is further configured to receive the contents of one of the scalar registers as input.

11. The apparatus of claim 10 wherein when the contents of one of the scalar registers is used as input, a scalar register value is broadcast from the one scalar register to all arithmetic logic units within a given processing element.

12. The apparatus of claim 9 wherein the plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice.

13. The apparatus of claim 12 further comprising a global accumulator unit to accumulate the results of each slice accumulator into a global accumulation register.

14. The apparatus of claim 9 wherein the plurality of block registers receives the data blocks from the main memory and the plurality of vector registers receives the data blocks from the plurality of block registers.

15. The apparatus of claim 9 wherein each processing element further comprises a mask register to exclude processing of the processing element.

16. An apparatus to process video comprising:
 a. means for configuring a plurality of processing elements into a two-dimensional array of processing elements such that each processing element includes a plurality of vector registers, a plurality of block registers, a plurality of scalar registers, and a plurality of arithmetic logic units, wherein a data path of each processing element includes a set of processing element slices each coupled to one arithmetic logic unit such that each arithmetic logic unit receives a specified portion of each vector register as input;
 b. means for configuring a video stream into data blocks coupled to the means for configuring a plurality of processing elements;
 c. means for loading the data blocks into the plurality of vector registers within each processing element, the means for loading coupled to the means for configuring the video stream;
 d. means for reading the specified portions of each vector register by each of the corresponding arithmetic logic units within all processing elements simultaneously, the means for reading coupled to the means for loading; and
 e. means for processing the read portions by the arithmetic logic units such that the data blocks from the plurality of vector registers is processed in parallel, the means for processing coupled to the means for reading.

17. The apparatus of claim 16 wherein the means for loading the data blocks into the plurality of vector registers, the means for reading the specified portions of each vector register, the means for processing the read portions, and the means for writing the results of the processing each operate within one processing element clock cycle.

18. The apparatus of claim 16 wherein each arithmetic logic unit is further configured to receive the contents of one of the scalar registers as input.

19. The apparatus of claim 18 wherein when the contents of one of the scalar registers is used as input, a scalar register value is broadcast from the one scalar register to all arithmetic logic units within a given processing element.

20. The apparatus of claim 16 wherein the plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice.

21. The apparatus of claim 20 further comprising a global accumulator unit to accumulate the results of each slice accumulator into a global accumulation register.

22. The apparatus of claim 16 further comprising means for loading the data block into the plurality of block registers prior to loading the data blocks into the plurality of vector registers, such that the data blocks are loaded into the plurality of vector registers from the plurality of block registers, the means for loading data blocks into the plurality of block registers coupled to the means for loading the data blocks into a plurality of vector registers.

23. The apparatus of claim 16 further comprising means for writing the results of the processing performed by the arithmetic logic units to the plurality of vector registers, the means for writing coupled to the means for processing.

24. An apparatus to process video, the apparatus comprising a two-dimensional array of processing elements, wherein each processing element includes a plurality of vector registers, a plurality of block registers, a plurality of scalar registers, and a plurality of arithmetic logic units, further wherein a data path of each processing element includes a set of processing element slices each coupled to one arithmetic logic unit such that each arithmetic logic unit receives a specified portion of each vector register as input.

25. The apparatus of claim 24 further comprising a main memory coupled to the two-dimensional array of processing elements, wherein video data is received by the main memory and configured as data blocks, the data blocks are loaded into the plurality of vector registers within each processing element, specified portions of each vector register are read by each of the corresponding arithmetic logic units simultaneously within all processing elements, the read portions are processed by the arithmetic logic units such that the data blocks from the plurality of vector registers are processed in parallel, and the results of the processing performed by the arithmetic logic units are written to the plurality of vector registers.

26. The apparatus of claim 25 wherein each arithmetic logic unit is further configured to receive the contents of one of the scalar registers as input.

27. The apparatus of claim 26 wherein when the contents of one of the scalar registers is used as input, a scalar register value is broadcast from the one scalar register to all arithmetic logic units within a given processing element.

28. The apparatus of claim 25 wherein the plurality of processing elements are further configured such that all processing elements within a same column of the array form a processing slice, and each processing element further comprises a local accumulation register to accumulate the results of the plurality of arithmetic logic units within the processing element, further wherein each processing slice is coupled to a slice accumulator such that each slice accumulator buffers the results from any one of the local accumulation registers corresponding to the processing elements of the processing slice.

29. The apparatus of claim 28 further comprising a global accumulator unit to accumulate the results of each slice accumulator into a global accumulation register.

30. The apparatus of claim 25 wherein the plurality of block registers receives the data blocks from the main memory and the plurality of vector registers receives the data blocks from the plurality of block registers.

31. The apparatus of claim 25 wherein each processing element further comprises a mask register to exclude processing of the processing element.

* * * * *